(12) United States Patent
Miyazaki et al.

(10) Patent No.: US 7,557,514 B2
(45) Date of Patent: Jul. 7, 2009

(54) INVERTER DRIVING CIRCUIT

(75) Inventors: Hiroyuki Miyazaki, Tokyo (JP);
Takeshi Hatakeyama, Tokyo (JP)

(73) Assignee: Sumida Corporation, Tokyo (JP)

( * ) Notice: Subject to any disclaimer, the term of this patent is extended or adjusted under 35 U.S.C. 154(b) by 0 days.

(21) Appl. No.: 11/819,670

(22) Filed: Jun. 28, 2007

(65) Prior Publication Data
US 2008/0042587 A1    Feb. 21, 2008

(30) Foreign Application Priority Data
Jul. 4, 2006    (JP)    ............... 2006-184110

(51) Int. Cl.
*H05B 37/00*    (2006.01)
(52) U.S. Cl. ............... 315/177; 315/276; 315/277; 315/278
(58) Field of Classification Search ............... 315/177, 315/194, 195, 312, 276–280, 246, 247
See application file for complete search history.

(56) References Cited

U.S. PATENT DOCUMENTS 5,781,418 A * 7/1998 Chang et al. ............... 363/16
7,038,397 B2 * 5/2006 Komatsu et al. ............ 315/276

FOREIGN PATENT DOCUMENTS

JP    2006-012781    1/2006
JP    2006-059761    3/2006

* cited by examiner

*Primary Examiner*—Douglas W Owens
*Assistant Examiner*—Jianzi Chen
(74) *Attorney, Agent, or Firm*—Oliff & Berridge, PLC

(57) ABSTRACT

While series resonant circuits 51 to 53 are connected to an output stage of a switching circuit 101 so as to be parallel mutually, primary sides of booster transformer sections 1 to 3 are connected to resonance capacitors 14 to 16 respectively, and further, CCFLs 21 to 23 are connected to secondary sides of the booster transformer sections 1 to 3 respectively.

5 Claims, 4 Drawing Sheets

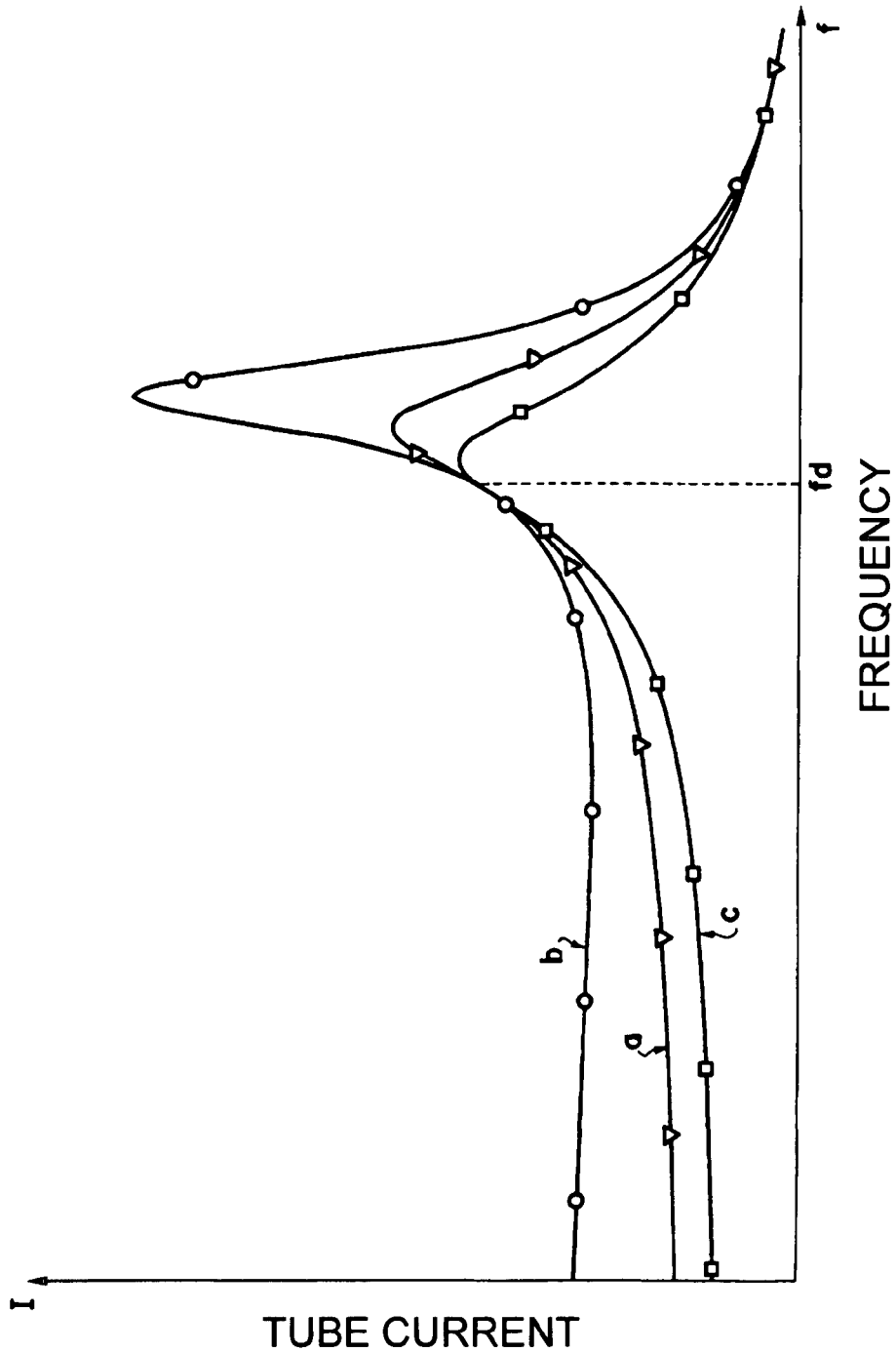

INVERTER DRIVING CIRCUIT

RELATED APPLICATIONS

This application claims the priority of Japanese Patent Application No. 2006-184110 filed on Jul. 4, 2006, which is incorporated herein by reference.

BACKGROUND OF THE INVENTION

1. Field of the Invention

The present invention relates to an inverter driving circuit which drives a plurality of electric-discharge lamps, and in particular, relates to an inverter driving circuit which simultaneously drives cold cathode fluorescent lamps (CCFL) for back lighting of various display panels used for a Laptop computer, a liquid crystal television, and the like.

2. Description of the Prior Art

An inverter driving circuit in which a booster transformer is mounted so as to drive a CCFL for back lighting of various display panels is known conventionally. In addition, recently, according to requests of upsizing of display panels, an inverter driving circuit which can simultaneously drive a plurality of CCFLs attracts attention. In such an inverter driving circuit, separately from the above-mentioned booster transformers, a balance transformer having special construction for making currents, which flow into a plurality of CCFLs, coincide mutually, for example, one which is described in Japanese Unexamined Patent Publication No. 2006-12781 is used.

Nevertheless, such a balance transformer has a limit in miniaturizing, and since it is generally arranged in a preceding stage of CCFLs, it has become an obstruction for promoting miniaturization of a display panel by securing the installation space (substrate area).

From such a situation, development of inverter driving circuits having the same function as that of a balance transformer has been also tried by devising circuit construction. For example, a circuit in which a series resonant circuit is connected to a preceding stage of primary windings of booster transformers as described in Japanese Unexamined Patent Publication No. 2006-59761 is known. In this way, it becomes possible to make approximately equal values of currents which flow into respective primary windings without using a balance transformer by connecting a series resonant circuit to a preceding stage of a plurality of primary windings.

Nevertheless, in the circuit construction described in the above-mentioned Japanese Unexamined Patent Publication No. 2006-59761, respective primary windings of the transformer arranged in a subsequent stage of the series resonant circuit are mutually connected to a power supply in series. Hence, since an applied voltage to each primary winding of the transformer is divided according to the number of the primary windings, and, it becomes necessary to enlarge a winding ratio. Hence, it was said that it was problematic construction in terms of efficiency.

SUMMARY OF THE INVENTION

The present invention is made in view of such situations, and aims at providing an inverter driving circuit which can reduce an installation space greatly in comparison with the conventional art using a balance transformer while achieving balancing of currents which flow into respective electric-discharge lamps when simultaneously driving a plurality of electric-discharge lamps, and which can further obtain efficiently a secondary side voltage applied to each electric-discharge lamp.

A first inverter driving circuit according to the present invention is an inverter driving circuit including a switching circuit which generates and outputs a high-frequency AC voltage on the basis of a DC voltage and a booster transformer which boosts the high-frequency AC voltage outputted from the switching circuit, and applies a secondary side output of the booster transformer to an electric-discharge lamp to enable drive of the electric-discharge lamp, characterized by being constructed so that primary windings of the booster transformer corresponds to a plurality of electric-discharge lamps respectively while being connected in parallel to the switching circuit, and wherein a series resonant circuit is connected corresponding to each of the primary windings in a subsequent stage of the switching circuit.

Further, in the inverter driving circuit according to the present invention, the series resonant circuit includes an inductive element and a capacitive element.

Still further, in the inverter driving circuit of the present invention, the primary winding of the booster transformer is connected not only to the capacitive element in parallel, but also to the inductive element in series.

Additionally, in the inverter driving circuit of the present invention, setting is performed so that values of currents which flow into the plurality of the electric-discharge lamps become equal mutually, and when this setting is performed, frequency fd is made an operating frequency of a switching element of the inverter driving circuit.

Further, in the inverter driving circuit according to the present invention, when a frequency at the time that values of currents which flow into the plurality of the electric-discharge lamps become equal mutually is made as fd, constants of respective elements which construct the series resonant circuit are set so that this frequency fd becomes a resonance frequency.

In addition, a second inverter driving circuit according to the present invention is an inverter driving circuit which drives a plurality of electric-discharge lamps, comprising series resonant circuits which drive respective switching elements at a frequency when values of currents which flow into the plurality of electric-discharge lamps become approximately equal mutually, and are provided corresponding to the plurality of electric-discharge lamps respectively, and booster transformers whose primary windings are connected in parallel to a part of elements of the series resonant circuits respectively, characterized in that the inverter driving circuit is constructed so that values of currents which flow into the plurality of electric-discharge lamps become approximately equal mutually by generating a voltage which relates to a product of a Q value of the series resonant circuits and an input voltage Vin.

Further, in the second inverter driving circuit according to the present invention, when a frequency at the time that values of currents which flow into the plurality of the electric-discharge lamps become equal mutually is made as fd, constants of respective elements which construct the series resonant circuit are set so that this frequency fd become a resonance frequency.

Still further, in the second inverter driving circuit of the present invention, the series resonant circuit includes an inductive element and a capacitive element.

BRIEF DESCRIPTION OF THE DRAWINGS

FIG. 4 is a characteristic curve graph illustrating an example of changing characteristics of tube currents to frequency changes of respective series resonant circuits in the inverter driving circuit according to the embodiment of the present invention.

DETAILED DESCRIPTION OF THE PREFERRED EMBODIMENT

Figure 1:
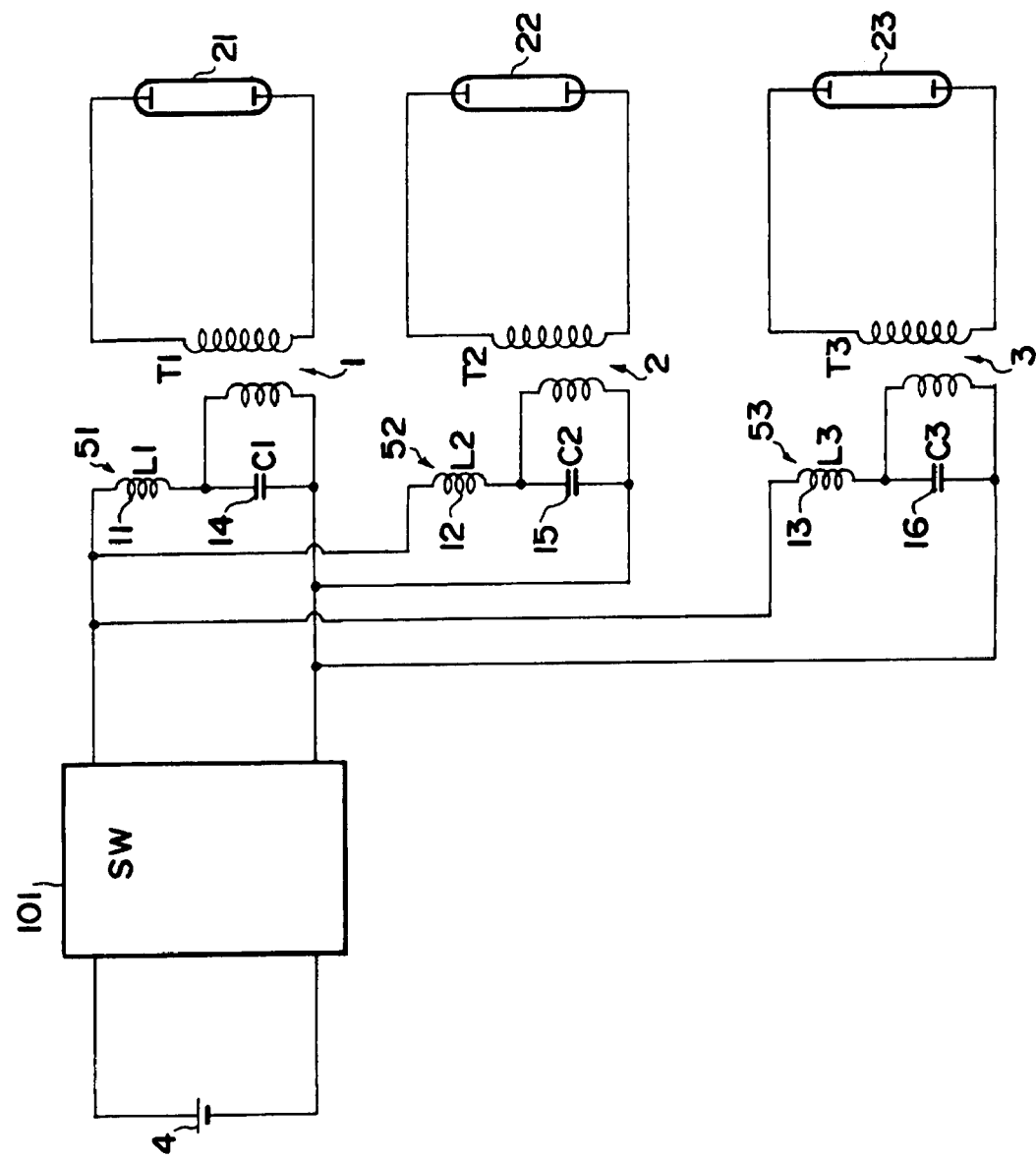
FIG. 1 is a schematic diagram illustrating a structural example of an inverter driving circuit according to an embodiment of the present invention.

Hereafter, an inverter driving circuit according to an embodiment of the present invention will be described with referring to FIGS. 1 to 4.

First, an inverter driving circuit according to an embodiment of the present invention will be described with referring to FIG. 1.

The inverter driving circuit according to the embodiment of the present invention is suitable for, for example, simultaneously discharging and lighting a plurality of cold cathode fluorescent lamps (hereafter, these are called CCFLs) for back lighting of various kinds of liquid crystal display panels used for a liquid crystal television and the like. In the following structural examples, a case that the number of CCFLs which are simultaneously driven is three will be exemplified and described.

Such an inverter driving circuit is constructed of a switching circuit (in FIG. 1, this is denoted by an "SW") 101, three booster transformer sections (in FIG. 1, these are denoted by "T1", "T2", and "T3" respectively) 1 to 3 provided according to CCFLs 21 to 23 to be driven, and series resonant circuits 51 to 53 provided in primary sides of the respective booster transformer sections 1 to 3 respectively, as main components. In addition, the booster transformer sections 1 to 3 are not limited to what are separated entities, but that they may be built in integrally to be made respective transformer sections of a multi-output transformer.

To an input side of the switching circuit 101, a DC power supply 4 is connected to generate a high-frequency high-voltage on the basis of an output voltage of the DC power supply 4. Its construction itself is publicly known one as this kind of circuit, for example, this is constructed by using a full bridge circuit using a transistor and the like.

First to third series resonant circuits 51 to 53 which are provided corresponding to the first to third booster transformer sections 1 to 3 are connected to an output side of this switching circuit 101 so as to become parallel mutually to this switching circuit 101. Furthermore, primary sides of the first to third booster transformer sections 1 to 3 are mutually connected through the first to third series resonant circuits 51 to 53. That is, through the switching circuit 101, the series resonant circuits 51 to 53 are constructed so as to be connected mutually in parallel to the DC power supply 4.

Here, the first to third series resonant circuits 51 to 53 have the same construction fundamentally, and are constructed by resonance choke coils 11 to 13 (in FIG. 1, these are denotes by "L1", "L2", and "L3" respectively) and resonance capacitors 14 to 16 (in FIG. 1, these are denoted by "C1", "C2", and "C3" respectively) being connected in series.

Then, the primary side of the first booster transformer section 1 is connected to both ends of the resonance capacitor 14 which is series-connected to the resonance choke coil 11. In addition, the primary side of the second booster transformer section 2 is connected to both ends of the resonance capacitor 15 which is series-connected to the resonance choke coil 12. Then, the primary side of the third booster transformer section 3 is connected to both ends of the resonance capacitor 16 which is series-connected to the resonance choke coil 13.

On the other hand, CCFLs 21 to 23 are connected to the secondary sides of the first to third booster transformer sections 1 to 3, respectively.

The inverter driving circuit with such construction can make tube current values of respective CCFLs 21 to 23 approximately equal (balanced) without using a balance transformer by the series resonant circuits 51 to 53 being made to operate at a predetermined output frequency, and their outputs being applied to the primary sides of the first to third booster transformer sections 1 to 3.

Hereafter, such operation of the inverter driving circuit will be described in detail with referring to FIGS. 2 to 4.

Figure 2:
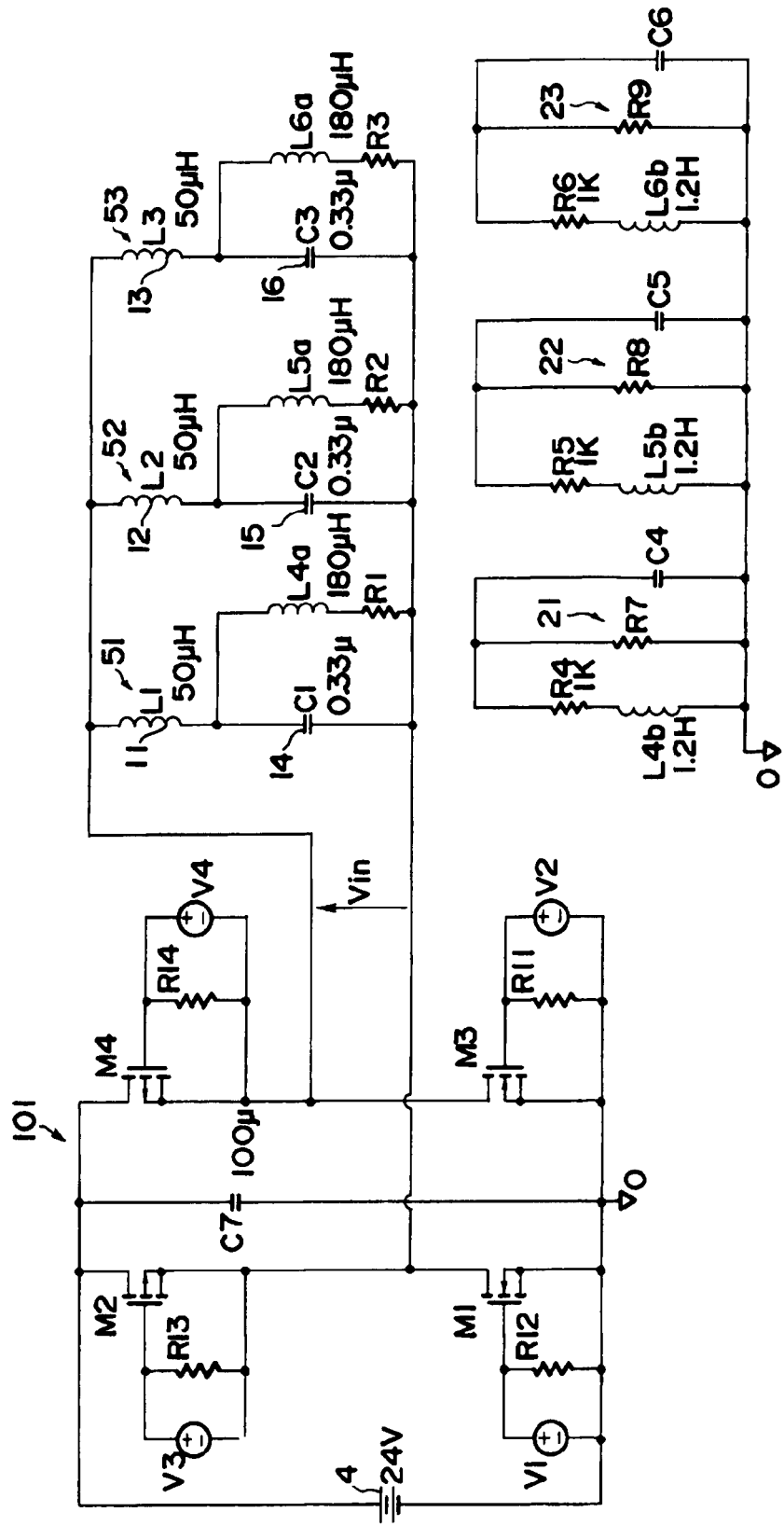
FIG. 2 is an equivalent circuit diagram of the inverter driving circuit illustrated in FIG. 1.

First, FIG. 2 is an equivalent circuit of the inverter driving circuit illustrated in FIG. 1, and this equivalent circuit will be described.

As an example of a concrete circuit of the switching circuit 101, FIG. 2 illustrates an example constructed of a full bridge circuit using two N-channel MOS field effect transistors M1 and M3, and two P-channel MOS field effect transistors M2 and M4. This circuit construction of the switching circuit 101 is an example to the last. So long as it is this kind of switching circuit, even if it uses other circuit construction, such as a half bridge circuit or a push pull circuit, it is sufficient naturally.

The primary side of the first booster transformer section 1 can be expressed as one in which a primary winding inductance L$4a$ and a primary winding resistor R1 are series-connected. This is also the same about the second and third booster transformer sections 2 and 3. The primary side of the second booster transformer section 2 can be expressed as one in which a primary winding inductance L$5a$ and a primary winding resistor R2 are series-connected, and the primary side of the third booster transformer section 3 can be expressed as one in which a primary winding inductance L$6a$ and a primary winding resistor R3 are series-connected.

In addition, the secondary sides of the first to third booster transformer sections 1 to 3 will be described. The secondary side of the first booster transformer section 1 can be expressed as one in which a secondary winding inductance L$4b$ and a secondary winding resistor R4 are series-connected, the secondary side of the second booster transformer section 2 can be expressed as one in which a secondary winding inductance L$5b$ and a secondary winding resistor R5 are series-connected, and the secondary side of the third booster transformer section 3 can be expressed as one in which a secondary winding inductance L$6b$ and a secondary winding resistor R6 are series-connected.

Furthermore, respective CCFLs 21 to 23 connected to the secondary sides of the first to third booster transformer sections 1 to 3 can be made to be equivalent to a circuit in which a resistor and a capacitor are parallel-connected. Specifically, the CCFL 21 can be expressed as a parallel connection circuit of a resistor R7 and a capacitor C4, the CCFL 22 can be expressed as a parallel connection circuit of a resistor R8 and a capacitor C5, and the CCFL 23 can be expressed as a parallel connection circuit of a resistor R9 and a capacitor C6. In addition, the capacitors C4, C5, and C6 are stray capacitance generated between respective CCFLs 21 to 23 and a frame (not illustrated) of a liquid crystal display panel, and the like, and are also called "panel stray capacitance."

In this FIG. 2, the specifically described circuit constants are examples, and in particular, as mentioned later, examples of constants after resetting of circuit constants of the first to third series resonant circuits 51 to 53 are illustrated.

Next, setting of the output frequency of the switching circuit 101 and setting of the circuit constants of the series resonant circuits 51 to 53 will be described.

First, values of the respective resonance choke coils 11 to 13 of the series resonant circuits 51 to 53 and the resonance capacitors 14 to 16 are properly selected temporarily on the basis of a simulation, test data, and the like. For example, FIG. 3 illustrates an example of dummy circuit constants in this phase in the form of the previous equivalent circuit. In addition, in this FIG. 3, the switching circuit 101 is expressed as one in which an AC power supply 5 and a resistor R10 are series-connected (in FIG. 3, the AC power supply 5 and the register R10 are shown instead of the switching circuit 101 and the DC power supply 4).

Then, frequency scanning is performed so that the frequency of the output voltage of the switching circuit 101 may be gradually changed from a low-frequency region to a high-frequency region, for example. Since the frequency range which can make the tube current values of the respective CCFLs 21 to 23 approximately equal on the basis of a simulation, test data, and the like can be forecast, it is preferable to set change range of the frequency on the basis of the frequency range forecast in such a way.

Then, as an example is illustrated in FIG. 4, it is possible to detect a frequency fd which makes the tube current values of the CCFLs 21 to 23 coincide approximately by performing the frequency scanning of the output voltage of the switching circuit 101.

FIG. 4 illustrates an example of tube current changes of the CCFLs 21 to 23 at the time of changing the frequency of the output voltage of the switching circuit 101 as mentioned above. In the figure, a characteristic curve to which reference character "a" is assigned shows the tube current change of the CCFL 21, a characteristic curve to which reference character "b" is assigned shows the tube current change of the CCFL 22, and a characteristic curve to which reference character "c" is assigned shows the tube current change of the CCFL 23, respectively.

In this way, finally the detected frequency fd of making the tube current values coincide is determined to be an operating frequency, that is, an output frequency of the switching circuit 101. Subsequently, the values of the resonance choke coils 11 to 13 of the first to third series resonant circuits 51 to 53, and the resonance capacitors 14 to 16 are reset so that the resonance frequency of the respective series resonant circuits 51 to 53 may become the frequency fd obtained as mentioned above.

As for this resetting of the constants of the resonance choke coils 11 to 13 and the resonance capacitors 14 to 16, both of the inductance and capacitance need not be always reset. That is, this resetting of the constants depends on the degree of a difference between the resonance frequencies of the respective series resonant circuits 51 to 53 before resetting, and the resonance frequency fd after resetting. But, what is necessary is just to perform resetting of the inductance, capacitance, or both suitably according to the degree of the difference between the frequencies.

Figure 3:
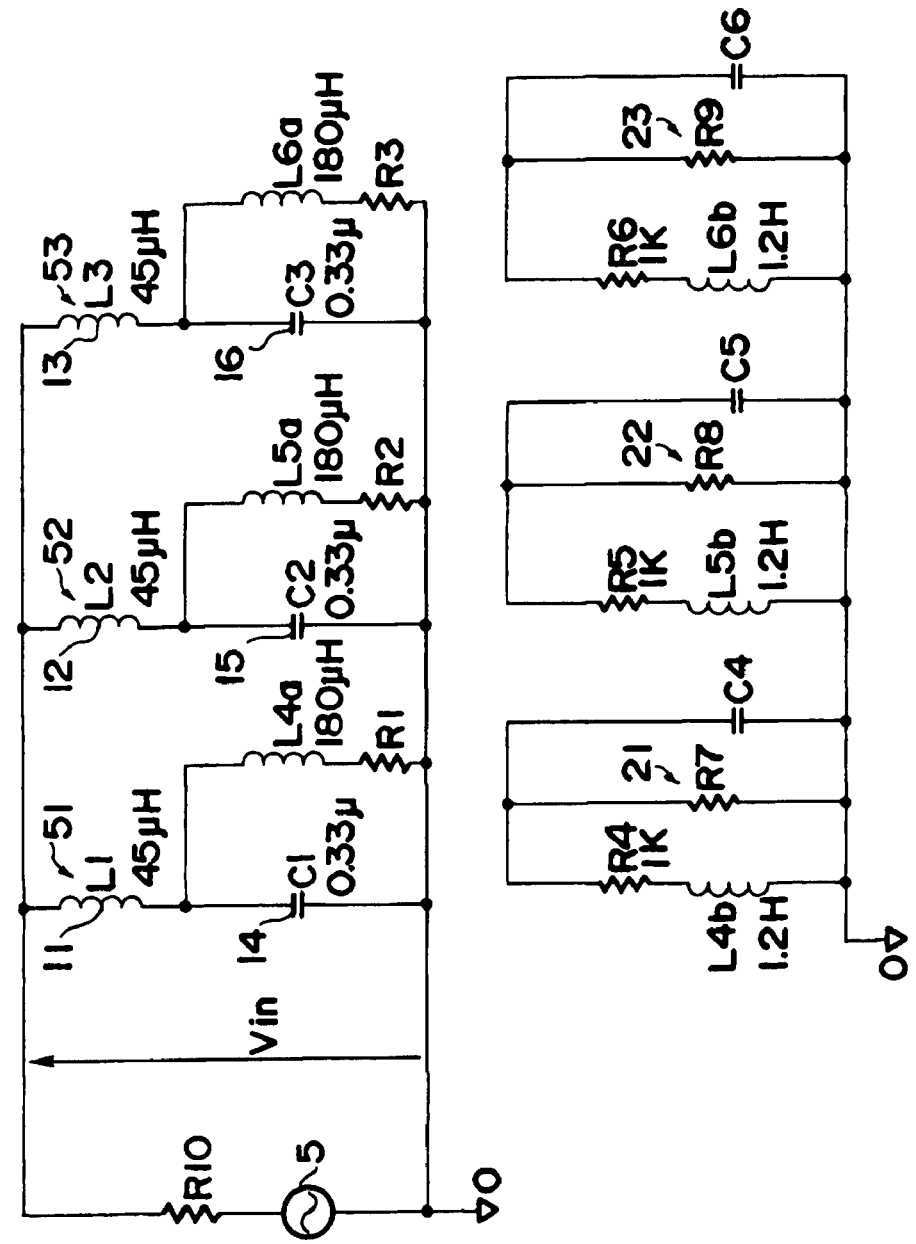
FIG. 3 is an equivalent circuit diagram illustrating circuit constants before resetting of constants of a series resonant circuit of the inverter driving circuit illustrated in FIG. 2.

The circuit constants of the series resonant circuits 51 to 53 in FIG. 2 are ones after resetting the constants of the circuit example illustrated in FIG. 3. In the case of this example, only the inductance values of the resonance choke coils 11 to 13 of the series resonant circuits 51 to 53 are reset.

In this way, by not only setting the output frequency of the switching circuit 101, but also resetting the resonance frequencies of the first to third series resonant circuits 51 to 53 to drive the CCFLs 21 to 23, the tube current values become approximately equal.

In such construction, supposing impedances of the CCFLs 21 to 23 fluctuate, the fluctuations of the impedances of the CCFLs 21 to 23 appear according to a winding ratio also in the primary sides of the first to third booster transformer sections 1 to 3 naturally. But, apparently from the equivalent circuit of FIG. 2, they become changes in both ends of the resonance capacitors 14 to 16 of the respective series resonant circuits 51 to 53.

When the impedance values seen from the primary sides of the transformers which are parallel-connected to the resonance capacitors 14 to 16 of the series resonant circuits 51 to 53 change, the changes cause changes of Q values of the series resonant circuits as known in the AC circuit theory. Specifically, when the impedance values seen from the primary sides of the transformers which are parallel-connected to the resonance capacitors 14 to 16 become large, Q values of the series resonant circuits 51 to 53 increase. On the other hand, each voltage Vc of both ends of the resonance capacitors 14 to 16 is expressed as Q×Vin using a voltage Vin applied to both ends of the series resonant circuits 51 to 53, which is the output voltage of the switching circuit 101. Hence, increase of the Q value causes increase of the voltage Vc, and the increase is transferred also to the secondary sides of the booster transformer sections 1 to 3. In consequence, since the voltages applied to the CCFLs 21 to 23 increase, decrease of the tube current values of the CCFLs 21 to 23 following the increase of impedances is compensated. Hence, the tube current values are maintained at approximately constant ones regardless of fluctuations of the impedances.

On the other hand, on the contrary to the above-described case, when the impedances of the CCFLs 21 to 23 become small, the Q values of the series resonant circuits 51 to 53 decrease contrary to the above. Hence, this causes decrease of each voltage Vc of both ends of the resonance capacitors 14 to 16. In consequence, in the secondary sides of the booster transformer sections 1 to 3, since each voltage applied to the CCFLs 21 to 23 decreases, each tube current value is decreased. Current increase caused by decrease of each impedance is suppressed, similarly to the case of the impedance increase, each tube current value is compensated for each tube current value to be maintained at an approximately constant one.

Two test examples are shown in the following Table 1. The test examples of the figure will be described below.

First, in a first example listed in Table 1 (a), the impedances of the CCFLs 21 to 23 are 150 KΩ, 75 KΩ, and 225 KΩ respectively, and panel stray capacitances are 6 pF, 7.5 pF, and 4.5 pF respectively.

Then, the tube current value of the CCFL 21 is 11.35 (mA (rms)), the tube current value of the CCFL 22 is 11.41 (mA (rms)), and the tube current value of the CCFL 23 is 11.12 (mA (rms)). Hence, it can be confirmed that dispersion among the tube current values is very small. In the case of this first example, when dispersion A among tube current values is defined as Δ={(difference between maximum value and minimum value of tube current)/(minimum value of tube current)}×100 (%), Δ=2.6% is obtained.

Next, a second example listed in Table 1(b) is different from the above-mentioned first example on a point that it is supposed that the panel stray capacitance of the CCFL 22 is 4.5 pF and the panel stray capacitance of the CCFL 23 is 7.5 pF.

Then, in this second example, the tube current value of the CCFL 21 is 11.39 (mA (rms)), the tube current value of the CCFL 22 is 11.45 (mA (rms)), and the tube current value of the CCFL 23 is 11.14 (mA) (rms). Since the dispersion A among these tube current values becomes 2.8%, similarly to the above-mentioned first example, the dispersion among the tube current values is very small.

TABLE 1

| CCFL impedance | | Panel stray capacitance | | Tube current value (mA(rms)) | | Δ |
|---|---|---|---|---|---|---|
| (a) First example | | | | | | |
| R7 | 150 KΩ | C4 | 6 pF | R7 | 11.35 | 2.6% |
| R8 | 75 KΩ | C5 | 7.5 pF | R8 | 11.41 | |
| R9 | 225 KΩ | C6 | 4.5 pF | R9 | 11.12 | |
| (b) Second example | | | | | | |
| R7 | 150 KΩ | C4 | 6 pF | R7 | 11.39 | 2.8% |
| R8 | 75 KΩ | C5 | 4.5 pF | R8 | 11.45 | |
| R9 | 225 KΩ | C6 | 7.5 pF | R9 | 11.14 | |

In addition, in the above, although a structural example in the case that three CCFLs 21 to 23 are simultaneously driven is illustrated, of course, the number of CCFLs which are simultaneously driven is not limited to this, but it may be an arbitrary number. What is necessary is just to construct it to conform to the structural example, which is mentioned above.

Furthermore, when driving other electric-discharge lamps instead of the CCFLs, it is naturally possible to apply the apparatus of the present invention.

In addition, the circuit construction illustrated in FIG. 1 is an example to the last, and it is not necessary to be limited to this. As long as it performs the same operation, other circuit constructions may be adopted. For example, a connection aspect of a series resonant circuit and a primary winding of a booster transformer is not limited to the aspect of FIG. 2.

Moreover, in the above-mentioned embodiment, although illustration is omitted, a control section for controlling the switching circuit 101 is provided. A signal detected in a low voltage side of one arbitrary CCFL is fed back in this control section, and constant current control is performed by the construction.

According to the first inverter driving circuit according to this embodiment, it is constructed so that a series resonant circuit may be connected to each of primary windings of the booster transformers provided corresponding to each of a plurality of electric-discharge lamps, and constants of respective elements which construct the series resonant circuit are set so that values of currents which flow into the plurality of these electric-discharge lamps may become approximately equal mutually. Hence, it is possible to achieve balancing (to make current values equal approximately) of currents which flow into respective electric-discharge lamps without using a balance transformer. Hence, it is possible to reduce an installation space of the driving circuit greatly. In addition, since series resonant circuits corresponding to respective primary windings are mutually connected in parallel to a switching circuit, a primary voltage applied to respective primary windings is not divided like the conventional art, and hence, it is possible to obtain a secondary voltage applied to each electric-discharge lamp efficiently.

In addition, according to the second inverter driving circuit according to this embodiment, series resonant circuits, where constants of components are set so that a frequency at the time when values of currents which flow into a plurality of electric-discharge lamps become approximately equal mutually may become a resonance frequency, are provided with corresponding to respective electric-discharge lamps. Furthermore, construction is made so that current values which flow into the respective electric-discharge lamps may become approximately equal mutually, by primary windings of booster transformers being connected in parallel to a part of elements of these series resonant circuits respectively, a voltage which relates to a product of a Q value of a series resonant circuit and an input voltage Vin being generated, and utilizing an operation that the above-mentioned Q value changes according to a resistive component to be connected to this series resonant circuit. Thereby, similarly to the above-mentioned first inverter driving circuit, it is possible to reduce an installation space of a driving circuit greatly with achieving balancing of currents which flow into respective electric-discharge lamps, and it is possible to obtain a secondary side voltage applied to each electric-discharge lamp efficiently.

What is claimed is:

1. An inverter driving circuit comprising:
   a switching circuit which generates a high-frequency AC voltage on the basis of a DC voltage;
   a plurality of booster transformers each having a primary winding and a secondary winding for boosting said high-frequency AC voltage which is outputted from said switching circuit;
   a plurality of series resonant circuits directly connected to said booster transformer primary windings and said switching circuit;
   a plurality of electric-discharge lamps connected to said booster transformer secondary windings;
   wherein each of said plurality of series resonant circuits and said booster transformer primary windings are connected in parallel to said switching circuit such that the same switching circuit AC voltage is applied to each of the plurality of series resonant circuits; and
   said switching circuit is driven at a predetermined frequency so that each current which flows into each of said plurality of electric-discharge lamps becomes equal mutually.

2. The inverter driving circuit according to claim 1, wherein each series resonant circuit includes an inductive element and a capacitive element.

3. The inverter driving circuit according to claim 1, wherein the primary winding of each booster transformer is connected in parallel with a capacitive element and the capacitive element is in series with an inductive element.

4. The inverter driving circuit according to claim 1, wherein a set frequency fd is made an operating frequency of a switching element of the inverter driving circuit.

5. The inverter driving circuit according to claim 1, wherein when a frequency at a time that values of currents which flow into the plurality of the electric-discharge lamps become equal mutually is made as fd, and constants of respective elements which comprise the series resonant circuits are set so that this frequency fd becomes a resonance frequency.

* * * * *